W. W. POPE.
CABLE CLAMP.
APPLICATION FILED JUNE 13, 1919.
1,341,438.
Patented May 25, 1920.
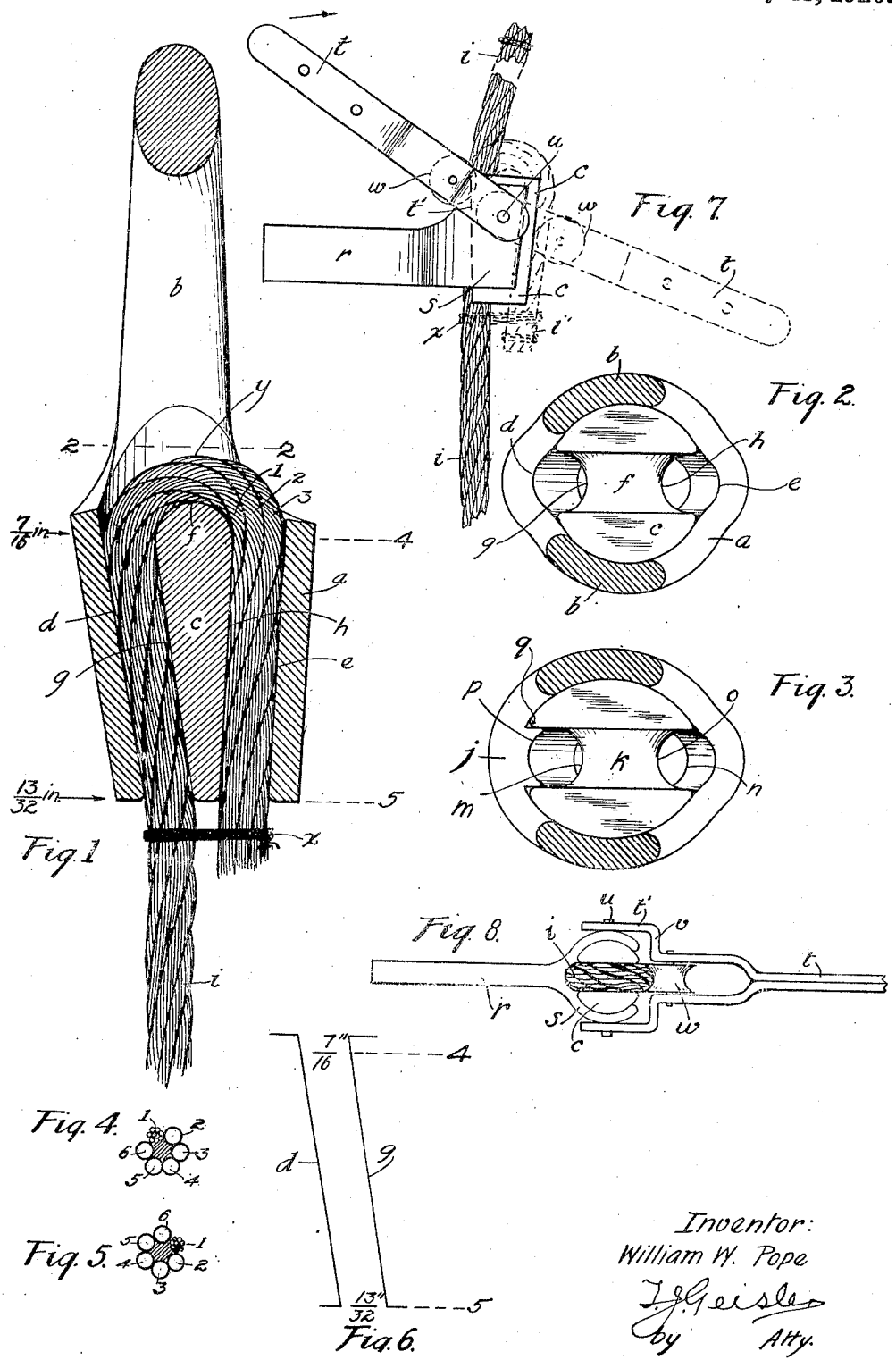
Inventor:
William W. Pope
by T. G. Geisler, Atty.

UNITED STATES PATENT OFFICE.

WILLIAM W. POPE, OF PORTLAND, OREGON.

CABLE-CLAMP.

1,341,438. Specification of Letters Patent. Patented May 25, 1920.

Application filed June 13, 1919. Serial No. 304,057.

*To all whom it may concern:*

Be it known that I, WILLIAM W. POPE, a citizen of the United States, and a resident of Portland, county of Multnomah, State of Oregon, have invented a new and useful Improvement in Cable-Clamps, of which the following is a specification.

The object of my invention is to make an efficient cable clamp of the type illustrated in Figure 1 of the accompanying drawings.

The defects of the prior construction of this type of clamp, and the special features of my improvements are more readily described by the aid of the accompanying drawings, in which:

Fig. 1 is a sectional elevation of my clamp, showing the same as used in practice;

Fig. 2 is a section on the line 2—2 of Fig. 1;

Fig. 3 is a similar section showing a possible variation of the construction of my clamp;

Fig. 4 is a diagrammatic cross-section of the cable shown in Fig. 1 on the plane indicated by the broken line 4 of said Fig. 1;

Fig. 5 is a diagrammatic cross-section of said cable on the plane indicated by the broken line of Fig. 1;

Fig. 6 diagrammatically illustrates one of the features of construction of my clamp;

Fig. 7 is an elevation of an implement provided by me for bending the cable-end around the wedge part of my clamp, and thus adapting the cable for being inserted in the socket of my clamp, and Fig. 8 is a top view of the device shown in Fig. 7.

My cable comprises a socket $a$, made with a shank $b$, and a wedge $c$ adapted for being inserted in the socket as illustrated more clearly in Fig. 2. The socket is made with grooves or concave clamping-surfaces $d$, $e$, and the wedge is made with opposed companion grooves or clamping surfaces $g$, $h$; these grooves providing the cavities for receiving the cable $i$.

In the course of many tests I discovered that when imposing a severe strain on the cable it had a tendency to break within the clamp, and usually at the top of the latter. I further discovered that the cause of the cable so failing was, it had a tendency to stretch from the point designated by the broken line 4 in Fig. 1 down, and to assume a tapering form of diminishing cross-section. Hence if the opposed clamping surfaces $d$ and $g$ of the socket $a$ and wedge $c$ are parallel to each other instead of having a conforming taper then the cable will be firmly clamped at about said point 4 and only loosely clamped below that point, where it is stretched into smaller cross section; and therefore the cable would have a tendency to break at the latter place.

To remedy this tendency I made the opposed clamping surfaces $d$ and $g$ of the socket and the wedge with a downward taper approximating that assumed by the cable; and hence when the severe pull is applied to the cable tending to cause it to stretch as mentioned, the downward convergence of said clamping surfaces of the socket and the wedge will assure that the cable portion between the points 4 and 5 of Fig. 1, is firmly gripped along the entire length of said clamping surface.

This described feature of my improved cable clamp is diagrammatically illustrated in Fig. 6, in which the lines $d$, $g$, represent the opposed clamping-surfaces of the socket and wedge.

Assuming the cable to have a diameter of half an inch the parts would be so adapted that when the wedge $c$ is positioned in the socket as shown in Fig. 1, the space between said clamping surfaces in the plane of the broken line 4 of Figs. 1 and 6, would be 7/16 of an inch, and from that point downward the lines $d$, $g$, would taper so that at the plane of the broken line 5 of Figs. 1 and 6, the distance between said lines $d$ and $g$ would be only 13/32 of an inch.

The converging or approach of said clamping surfaces $d$, $g$, toward each other and the gradual diminishing of the diameter of said composite groove from the top downward also serves to minimize the tendency of the cable to stretch within the clamp as mentioned.

Furthermore I discovered that in order to obtain full efficiency the wedge should be made of the same length approximately as the socket, so that the clamping surface $d$, of the latter will be opposed for its entire length by the clamping surface $g$ of the wedge. Such construction is necessary in order to obtain the full benefit of said convergence of the opposed clamping surfaces.

It is also essential to avoid any cutting effect upon the cable by the lower edge of wedge, as would exist if the lower edge of the wedge were located within the socket instead of being approximately flush with the lower face of the latter.

It is furthermore essential that the opposed clamping surface of the socket and wedge be of sufficient length to grip individually all the strands of the cable for a substantial distance. By having reference to Figs. 1, 4 and 5 it is seen that the cable $i$ is composed of six strands, designated respectively 1, 2, 3, 4, 5, 6, and that each strand almost makes a complete circle in the distance or length between the points 4 and 5 of Fig. 1; therefore each cable strand has in turn, during said length, brought to bear upon it the direct, firm grip of the two opposed clamping surfaces $d$ and $g$ of the socket and wedge, while if the clamp were made of lesser length only some of the strands would be brought under such firm grip.

The companion grooves or clamping surfaces $d$, $g$, of the socket $a$ and wedge $c$, are so located as to bring the draft on the cable approximately in alinement with the longitudinal center of the clamp.

The clamp has to be made in size proportional to the cable on which it is to be used, following in this regard the general proportions illustrated in Figs. 1 and 2, and in the description thereof.

Fig. 3 represents two optional variations in construction. The socket $j$ and wedge $k$ are made oval, so as to assure the latter will be properly seated in the former, in order to bring the companion grooves and clamping surfaces $l$, $m$ and $n$, $o$ opposite each other. The same result may be also obtained by making the socket $j$ with a longitudinal rib $p$, and the wedge $k$ with a companion groove $q$.

The implement shown in Figs. 1 and 8, for bending the end $i'$ of the cable $i$, consists of a shank $r$, made with a claw $s$ for holding the wedge $c$. A handle $t$, made with a forked end $t'$ is pivoted on the claw $s$ at $u$, and the forked end $t'$ is made with a shoulder $v$. Adjacent the latter is journaled a roller $w$.

In using my implement the wedge $c$ is first put in place. The cable is then inserted as shown in Fig. 7. The handle $t$ is then moved to its position in dotted outline, thereby bending the cable end $i'$ to its position in dotted outline.

The bent cable-end being secured by a season-wire $x$, the wedge $c$ may then be removed and placed in the socket of the clamp as illustrated in Fig. 1. And as soon as the pull of the load is applied, the parts will become arranged approximately as illustrated in the last mentioned figure.

Since the cable is firmly gripped by the clamping surfaces $d$, $g$, of the socket and wedge, there will be only a minimum stress on the bend part $y$ of the cable on the grooved upper part $f$ of the wedge $c$. The companion gripping-surfaces $e$ $h$ of the socket and cable serve to grip the extremity of the cable as usual.

I claim:

1. A clamp comprising a socket and a tapering wedge, each made with companion half grooves providing two sets of diametrically located cavities for receiving a cable-end, and constituting clamping surfaces for the latter; the opposed clamping surfaces of one set of companion half grooves approaching each other from the top downward thereby gradually diminishing the diameter of said grooves and assuring a firm grip of the cable-end by said clamping surfaces and along the whole length thereof notwithstanding any stretch of the cable in said set of grooves.

2. A clamp comprising a socket and a tapering wedge, each made with a companion half groove forming a cavity for receiving a cable end and constituting clamping surfaces for the latter; said clamping surfaces approaching each other from the top downward thereby gradually diminishing the diameter of said grooves and, assuring a firm grip of the cable-end by, said clamping surfaces, and along the whole length thereof notwithstanding any stretch of the cable of said grooves.

3. A clamp comprising a socket and a tapering wedge, each made with a companion half groove forming a cavity for receiving a cable end and constituting clamping surfaces for the latter; said clamping surfaces approaching each other from the top downward thereby gradually diminishing the diameter of said grooves and assuring a firm grip of the cable-end by said clamping surfaces and along the whole length thereof notwithstanding any stretch of the cable in said grooves, and said socket and wedge being adapted to cause the proper seating of the latter in the socket for bringing said companion half grooves into registration.

WILLIAM W. POPE.